United States Patent [19]

Furusawa

[11] Patent Number: 4,739,467

[45] Date of Patent: Apr. 19, 1988

[54] PROPORTIONAL CONTROL SYSTEM

[75] Inventor: Kazuo Furusawa, Kyoto, Japan

[73] Assignee: Shimadzu Corporation, Kyoto, Japan

[21] Appl. No.: 889,099

[22] Filed: Jul. 23, 1986

[30] Foreign Application Priority Data

Sep. 30, 1985 [JP] Japan .................. 60-218771

[51] Int. Cl.⁴ .................................................. G05B 13/00
[52] U.S. Cl. ................................. 364/148; 364/160;
364/166; 364/176; 364/557; 364/151; 364/154;
318/609
[58] Field of Search .............. 364/148, 151, 154, 157,
364/166, 161, 162, 163, 176, 160, 557; 318/609,
610

[56] References Cited

U.S. PATENT DOCUMENTS

| | | | |
|---|---|---|---|
| 3,906,324 | 9/1975 | Smith | 364/145 |
| 4,527,246 | 7/1985 | Masson | 364/557 |
| 4,556,956 | 12/1985 | Dickenson | 364/157 |
| 4,675,804 | 6/1987 | Wiemer | 364/157 |

Primary Examiner—Joseph Ruggiero
Assistant Examiner—Allen MacDonald
Attorney, Agent, or Firm—Koda and Androlia

[57] ABSTRACT

A proportional control system for completely controlling a physical quantity under control without leaving an uncontrolable residue. In this control system, each time the system comes into an equilibrium state with a residue left uncontrolled, the manipulating quantity is changed to a new value which is proportional to the sum of a constant value equal to the manipulating quantity stabilized at the equilibrium and an instantaneous difference between a last previous equilibrium value of a physical quantity under control and an aiming value at which the physical quantity under control is to be kept finally.

2 Claims, 3 Drawing Sheets

PROPORTIONAL CONTROL SYSTEM

BACKGROUND OF THE INVENTION

The present invention relates to a proportional control system, and more particularly to a proportional control system made substantially free from a residual value left uncontrolled. In principal, an ordinary proportional control system cannot completely control a physical quantity so as to put the quantity exactly at an aiming value without being accompanied by a residual value left uncontrolled. Suppose a proportional heater controller for controlling a heater so as to keep the temperature, for example, of water in a bath at a predetermined aiming value higher than ambient temperature. The instantaneous temperature of the water is detected by an electrical temperature sensor such as a thermistor. The water temperature thus detected in the form of an electric signal is (amplified and then) compared with a reference voltage by a comparator, the reference voltage being predetermined so as to correspond to the above aiming temperature at which the water is to be kept. The output from the comparator is thus proportional to the difference of the detected temperature from the aiming temperature. The heater is power-supplied in proportion to the output from the comparator, that is, the water is power-supplied in proportion to the difference between the water temperature and the aiming temperature so long as the former is lower than the latter. In the course of such heater controlling, as the water temperature increases toward the aiming temperature, the power to be supplied to the heater, namely, to the water decreases owing to a decrease in the difference of the water temperature from the aiming value. On the other hand, as the water temperature increases, the heat dissipation from the water to its environment also increases. As a result, the power supply (to the water) and the heat dissipation (from the water) come to be balanced with each other. For the reason, the difference between the water temperature and the aiming temperature decreases by no means to zero exactly, but remains at a certain residual value corresponding to a power necessary to compensate the heat dissipation. The control system is, therefore, brought into an equilibrium state with the water kept at a temperature lower than the aiming value by an uncontrolable residual value. This uncontrolable residual value can be reduced, in principle, to an infinitesimally small value by infinitely increasing the proportionality factor of power supply, but such a design is of course impractical. As is understood from the above description, it is impossible, in practice, for the known proportional controllers to control any physical quantity so as to keep it exactly at a predetermined aiming value. Such a deficiency has conventionally been remedied by offsetting the residual value either through a manual operation or with a special adjusting means equipped additionally. However, the manual method of offsetting is not only troublesome and often lacking in precision but also in need of constantly inspecting the environmental physical quantity concerned (e.g. the atmospheric temperature surrounding the water on the occasion of the above exemplified heater controller), while the additional means makes the whole system complicated because of the necessity of coping with all the possible variations of the environmental condition. Another method of eliminating the deficiency is to incorporate a known integral control system to the proportional controller, making the whole apparatus a PI controller (which is no longer a proportional controller in a strict sense). Though the incorporation of an integral control system makes it possible to eliminate the uncontrolable residual values, the apparatus, if computer-controlled, disadvantageously needs a memory with a large capacity because the integral operation takes a long time.

OBJECTS AND SUMMARY OF THE INVENTION

The present invention aims at solving the above mentioned disadvantages accompanying the known proportional control system, and makes it an object to provide a proportional control system improved so as to be substantially free from an uncontrolable residual value.

Another object of the present invention is to constitute such an improved proportional control system in a simple computerized construction.

In the following the principle of the present invention is described with a temperature control system exemplified.

Suppose that an objective whose temperature is to be controlled finally to an aiming temperature $T_a$ (constant) is at an instantaneous temperature t (variable) being surrounded by an environmental temperature $T_e$ (constant), we can define, with respect to the objective, the temperature deviation $\delta$ from the aiming temperature $T_a$ and the temperature difference D from the environmental temperature $T_e$ as given below:

$$\delta = T_a - t, \quad (1)$$

$$D = t - T_e \ldots \quad (2)$$

Under the above definitions, if a relation $T_e < t < T_a$ is assumed in the beginning, the objective continues to be supplied with a power which varies in proportion to $\delta$:

$$W = W^{(0)} = K\delta, \ldots \quad (3)$$

where K is a proportionality factor. On the other hand the objective dissipates thermal energy at a rate E, which is generally represented by a non-linear function of D:

$$E = f(D) \ldots \quad (4)$$

In equilibrium, therefore, the power supply W and the thermal energy dissipation rate E should be balanced with each other, enabling Eqs. (3) and (4) to be put equal to each other:

$$K\delta = f(D) \ldots \quad (5)$$

This equation, in which $\delta$ and D are related to each other through Eqs. (1) and (2), can be solved, in principle, with respect to $\delta$, giving a residual temperature deviation $\delta_1$ which remains constant in the equilibrium. Referring to FIG. 3 which graphically represents Eqs. (3) and (4) (and Eqs. (8) and (15) mentioned later), $\delta_1$ is graphically given by the temperature deviation corresponding to point S where Eqs. (3) and (4) cross each other. Therefore, the objective remains at a constant temperature obtained from Eq. (1) with $\delta_1$ substituted for $\delta$:

$$t_1 = T_a - \delta_1 \ldots \quad (6)$$

The substitution of $t_1$ for $t$ in Eq. (1) directly gives the corresponding temperature difference D (graphically the temperature difference corresponding to point S in FIG. 3) between the objective and the environment:

$$D_1 = t_1 - T_e \ldots \quad (7)$$

In a conventional proportional control system, therefore, the objective can never be heated up exactly to the aiming temperature $T_a$, but continues to be kept at a temperature $t_1$ which is lower than $T_a$ by $\delta_1$, which remains uncontrolled. In order to substantially eliminate such an uncontrollable residue $\delta_1$, the control system according to the present invention is devised, as is described in succession, so as to perform an additional control operation each time an equilibrium state is established between the power supply and the heat dissipation.

Namely, after the above (first) equilibrium has been established keeping the objective at the equilibrium temperature $t_1$, which is lower than the aiming temperature $T_a$ by the residual deviation $\delta_1$ (refer to Eqs. (6) and (7)), the power supply W to the objective is changed to $W^{(1)}$ given by:

$$W^{(1)} = K\delta_1 + G_1\delta, \ldots \quad (8)$$

where $G_1$ is a new proportionality factor, which may be equal to K. The first term $K\delta_1$ on the right-hand side of Eq. (8) is a constant equal to the power continuing to be supplied in the first equilibrium, while the second term is a new proportional term. With the new proportional power supply $G_1\delta$ added to $K\delta_1$ (=constant), the objective begins to have its temperature increased until the next, namely, second equilibrium state is established between the increased power $W^{(1)}$ and the heat dissipation $E = f(D)$ ((Eq.4)). To obtain the residue to be left uncontrolled in the second equilibruim, let us first approximate Eq. (4), as is shown below, by expanding it to the first order around $D_1$ (given by Eq. (7)):

$$E = f(D) = f(D_1) + \left(\frac{\partial f}{\partial D}\right)_{D1} \cdot (D - D_1) \quad (9)$$

$$= K\delta_1 + \left(\frac{\partial f}{\partial D}\right)_{D1} \cdot (\delta_1 - \delta),$$

where a relation $F(D_1) = K\delta_1$ is taken into consideration and the conversion of $(D - D_1)$ to $(\delta_1 - \delta)$ is based on the relation represented by Eqs. (1), (2), (6) and (7). In the second equilibrium Eq. (8) can be put equal to Eq. (9), giving a relation shown below:

$$G_1\delta = \left(\frac{\partial f}{\partial D}\right)_{D1} \cdot (\delta_1 - \delta) \quad (10)$$

$$= F_1(\delta_1 - \delta),$$

where the constant $F_1$ represents $(\partial f/\partial D)_{D1}$. This equation can be solved with respect to $\delta$, giving the temperature deviation $\delta_2$ in the second equilibrium (graphically corresponding to point S' in FIG. 3):

$$\delta = \frac{F_1}{G_1 + F_1} \delta_1 \equiv \delta_2. \quad (11)$$

The temperature $t_2$ of the objective in the second equilibrium is obtained by substituting $\delta_2$ for $\delta$ in Eq. (1):

$$t_2 = T_a - \delta_2 \ldots \quad (12)$$

As is understood from Eq. (11), $$\delta_2 < \delta_1, \ldots \quad (13)$$

because of $F_1/(G_1 + F_1) < 1$, and accordingly, $$t_2 < t_1 \ldots \quad (14)$$

Inequalities (13) and (14) show that, in the second equilibrium, the temperature of the objective comes nearer to the aiming temperature $T_a$.

Following the second equilibrium the control system proceeds to the third equilibrium (graphically corresponding to point S'' in FIG. 3) with the power supply W shifted to $$W^{(2)} = K\delta_1 + G_1\delta_2 + G_2\delta, \ldots \quad (15)$$

and then continues to stepwise perform similar control operations successively, until the objective is brought up to a temperature considered to be sustantially equal to the aiming temperature $T_a$.

Accordingly, the temperature deviation $\delta_n$ left uncontrolled in the n-th equilibrium is, correspondingly to Eq. (11), given as below:

$$\begin{aligned}
\delta_n &= \frac{F_{n-1}}{G_{n-1} + F_{n-1}} \delta_{n-1} \\
&= \frac{F_{n-2}}{G_{n-2} + F_{n-2}} \frac{F_{n-1}}{G_{n-1} + F_{n-1}} \delta_{n-2} \\
&= \frac{F_1}{G_1 + F_1} \frac{F_2}{G_2 + G_2} \cdots \frac{F_{n-1}}{G_{n-1} + F_{n-1}} \delta_1 \\
&= \delta_1 \prod_{j=1}^{n-1} \frac{F_j}{G_j + F_j},
\end{aligned} \quad (16)$$

In Eq. (16), $G_j$ (j=1, 2, ..., n−1) are the proportionality factors appearing in the equation $W^{(j-1)} = K\delta_1 + G_1\delta_2 + G_2\delta_3 + \ldots + G_{j-1}\delta$ which expresses, corresponding to Eq. (8), the power to be supplied to the objective in the course toward the j-th equilibrium, while $F_j$ (j=1, 2, ..., n−1) represent $(\delta f/\delta D)_{Dj}$ in the equation $G_{j-1}\delta = (\delta f/\delta D)_{Dj-1}(\delta_{j-1} - \delta)$ which corresponds to Eq. (10). The temperature deviation $\delta_n$ obtained from Eq. (16) gives the temperature $t_n$ of the objective in the n-th equilibrium:

$$t_n = T_a - \delta_n \ldots \quad (17)$$

By increasing the number n infinitely, the temperature deviation $\delta_n$ can be made infinitesimally small because all of $F_j/(G_j + F_j)$ are smaller than unity. Accordingly, the temperature $t_n$ can be made, in principle, to come infinitesimally near to the aiming temperature $T_a$ by increasing the number n infinitely.

Incidentally, if the proportionality factors $G_j$ are equal to one another and also to K, the three linear graphs of $W^{(0)}$, $W^{(1)}$ and $W^{(2)}$ in FIG. 3 are parallel to one another. FIG. 3 shows only the processes up to the third equilibrium. In addition, if the function $E=f(D)$ representing the power dissipation rate from the objective can be considered to be linear, Eq. (16) is reduced to $$\delta_n = \delta_1 \left(\frac{F}{G+F}\right)^{n-1}, \quad (18)$$

where $F=F_j$ and $G=G_j$ $(j=1, 2, \ldots, n-1)$.

DETAILED DESCRIPTION OF THE INVENTION

Figure 1:
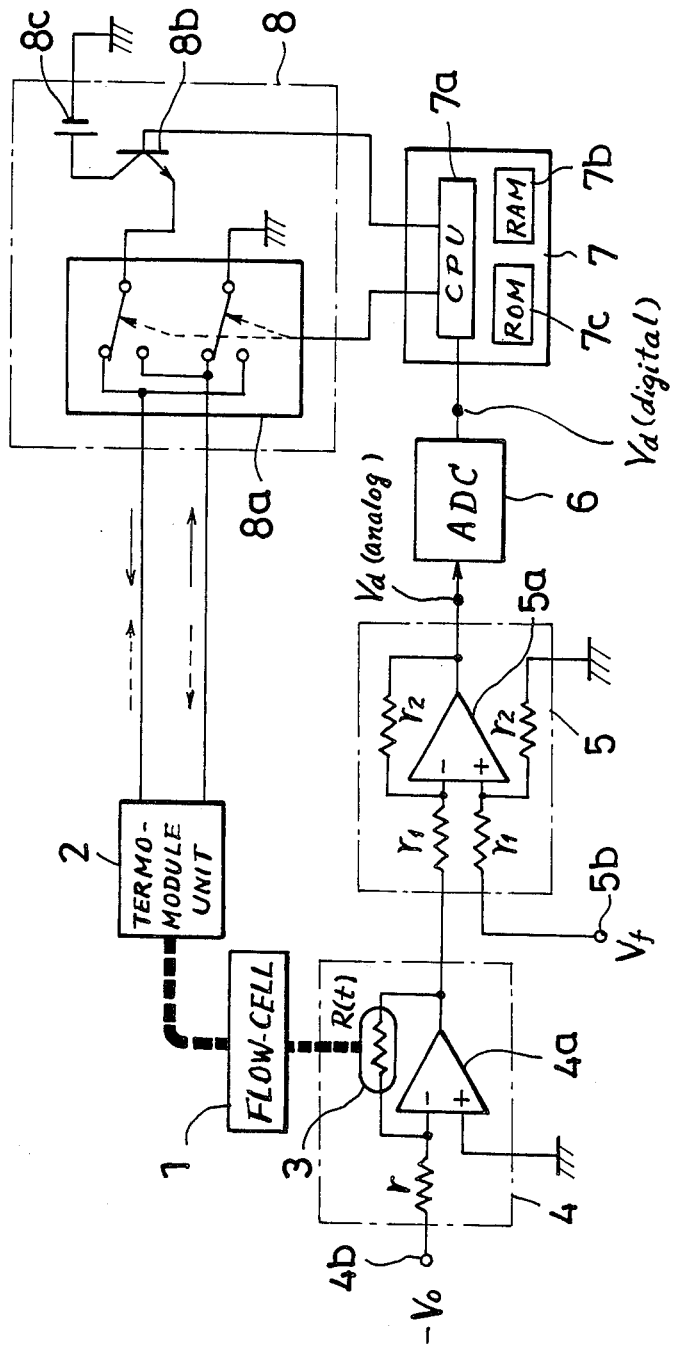
FIG. 1 is a block-diagrammatic circuit constitution of an embodiment of the present invention.
Figure 2:
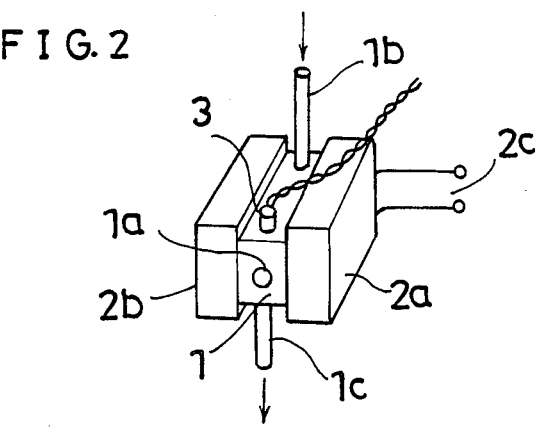
FIG. 2 shows a perspective view of the flow-cell unit used in the embodiment.
Figure 4:
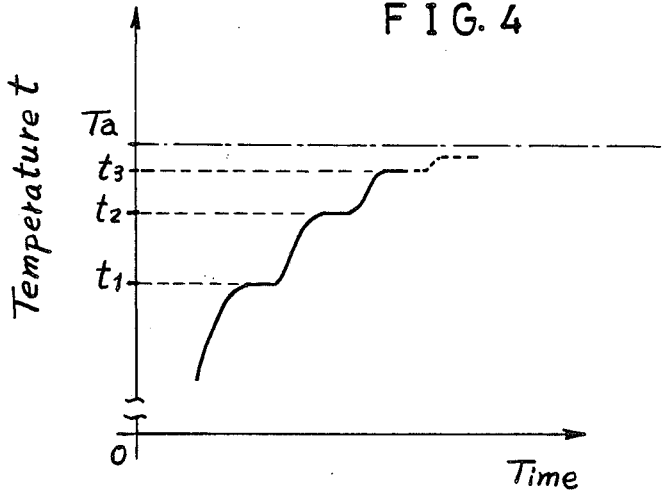
FIG. 4 is a graphical representation showing the steps of temperature control of the embodiment.

The present invention is described in detail in reference to an embodiment of the invention. The embodiment is constituted as a temperature control for a flow-cell used in a spectrophotometer. The entire constitution of the embodiment is block-diagrammatically shown in FIG. 1. In FIG. 1, a thermomodule unit 2 and a thermistor 3 are thermally in contact with a flow-cell 1, as is indicated with thick dotted lines. The practice of the thermal contact among them is illustrated in FIG. 2. The thermomodule unit 2 shown as one block in FIG. 1 is composed, as is shown in FIG. 2, of a pair of thermomodules 2a and 2b which sandwich the flow-cell 1 therebetween. The thermomodules 2a and 2b are connected electrically in series with each other and currentsupplied through leads 2c. On the other hand the thermistor 3 is embeded in the flow-cell 1. The thermistor 3 is for sensing the temperature of the flow-cell 1, while the thermomodules 2a and 2b supply heat to or take out heat from the flow-cell 1 in accordance with the polarity of the current supplied thereto. The flow-cell 1 is further provided with a sample (liquid) charge pipe 1b, a sample discharge pipe 1c and a light window 1a for leading an incident light into the cell 1. In the entire circuit constitution shown in FIG. 1, the thermistor 3, whose resistance $R(t)$ has a positive temperature-coefficient, plays a role of the feed-back resistor in an inverting amplifier circuit 4 in which an operational amplifier 4a is used. The inverting input terminal of the operational amplifier 4a is connected to an outer terminal 4b through an input resistance r. The terminal 4b is kept at a minus constant voltage $-V_0$. The output from the amplifier circuit 4 is compared with a reference voltage $V_f$ by a differential amplifier 5 consisting of an operational amplifier 5a and related resistances $r_1$'s and $r_2$'s. Thus the differential amplifier circuit 5 outputs a difference signal $V_d$ in proportion to the difference between the reference voltage $V_f$ and the output from the amplifier circuit 4. The difference signal $V_d$ is then digitalized by an A-D converter 6 and then inputted to a microcomputer 7, which comprises a CPU 7a, a RAM 7b and a ROM 7c. The microcomputer 7 generates operation signals to operate a thermomodule driving circuit 8 in accordance with the difference signal $V_d$. Supplied with a current from the thermomodule driving circuit 8, the thermomodule unit 2 supplies heat to or absorbs heat from the flow-cell 1 to control the same to be at a predetermined aiming temperature. The detailed function of the embodiment having such a constitution is described in the following on reference also to the formulae and FIG. 4 mentioned in the preceding section of Objects and Summary of the Invention.

Figure 3:
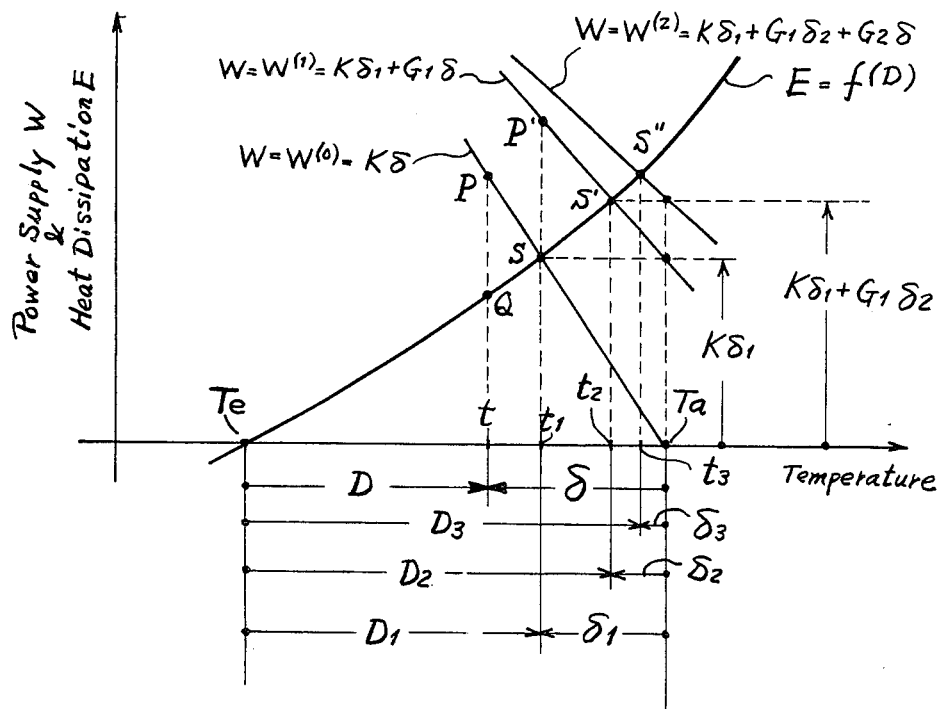
FIG. 3 is a graphical representation illustrating the principle and function of the present invention.

Suppose, for instance, that a relation $T_e \leq t < < T_a$ exists in the beginning, where $T_e$ is the environmental temperature around the flow-cell 1, t the temperature of the flow-cell 1 and $T_a$ an aiming temperature. The inverting amplifier circuit 4 (with the terminal 4b kept at a minus potential $-V_0$) outputs a temperature signal of a voltage $(V_0/r)R(t)$ according to the resistance $R(t)$ of the thermistor 3, which resistance R reflects the temperature t. The differential amplifier circuit 5 compares the temperature signal with a positive reference voltage $V_f$ which is set at a value corresponding to an aiming temperature $T_a$ at which the flow-cell 1 is to be finally maintained. Therefore, the reference voltage $V_f$ is equal to $(V_0/r)R(T_a)$. Comparing $(V_0/r)R(t)$ with $V_f=(V_0/r)R(T_a)$, the differential amplifier 5 output a difference signal:

$$\begin{aligned} V_d(t) &= (r_2/r_1)[V_f - (V_0/r)R(t)] \\ &= \alpha[R(T_a) - R(t)], \\ (\alpha &= r_2 V_0/(r_1 r)) \end{aligned} \quad (19)$$

which is proportional to the difference between the temperature signal $(V_0/r)R(t)$ and the reference signal $V_f$. Eq. (19) corresponds to Eq. (1) (and to Eq. (3) as is mentioned later). This difference $V_d$ is digitalized by the A-D converter 6 and then inputted to the microcomputer 7. According to the polarity and magnitude of the difference signal $V_d$, the microcomputer 7 generates predetermined operation signals and operates the thermomodule driving circuit 8 which comprises a current direction switching element 8a a switching transistor 8b and a DC source 8c. In case the polarity of $V_d$ indicates $t < T_a$ as in the present case, the microcomputer 7 operates the current direction switching element 8a so that a current supplied from the switching transistor 8b may be forwarded in the direction making the thermomodule unit 2 generate heat. In addition the computer 7 generates (from the CPU 7a) a pulse signal whose width U is proportional to the magnitude of $V_d$ within the period of signal-sampling by the A-D converter 6. This pulse signal drives the switching transistor 8a to make the same output a thermomodule driving pulse current with the same width U. Supplied with this pulse current, the thermomodule unit 2 generates a heat proportional to the difference signal $V_d$, increasing the temperature t of the flow-cell 1 toward the aiming temperature $T_a$. This stage of controlling corresponds to the power supply according to Eq. (3). As t increases toward $T_a$, $R(t)$ (having a positive temperature-coefficient) also increases toward $R(T_a)$ causing $V_d$ to decrease. The decrease of $V_d$ is accompanied by a decrease in the pulse width of the operation signal outputted from the computer 7 (CPU 7a) to the transistor 8b resulting in a decrease of the heat generation by thethermomodule unit 2. On the other hand, the heat dissipation from the flow-cell 1 increases in accordance with Eq. (4), as the temperature t increases. The coincident processes of the decreasing heat supply to the flow-cell 1 and the heat dissipation from the same presently come to offset each other bringing the whole control system into the first equilibrium before the temperature t of the flow-cell 1 is brought to the aiming value $T_a$. This means that, in FIG. 3, points P and Q move to point $\delta$ to converge there. In this first equilibrium, t and $V_d$ remain at $t_1 < T_a$ and at $V_{d1} = V_d(t_1)$, respectively. (Refer to Eqs. (5), (6) and (7).)

After having confirmed the (first) equilibrium by observing that the difference signal $V_d$ remains at a constant value $V_{d1} = V_d(t_1)$ for a predetermined period of time, the microcomputer 7 stores the value in the RAM 7b and, in the same time, renews the pulse width U of the generating operation signal so as to be proportional to:

$$V_D(t) = V_{d1} + \alpha[R(Ta) - R(t)], \ldots \quad (20)$$

which is the sum of the stored value $V_{d1}$ and a difference voltage $V_d(t) = \alpha[R(Ta) - R(t)]$ thereafter outputted from the amplifier 5. (Just after the microcomputer 7 renews the pulse width, Eq. (20) is equal to $2V_{d1}$, because t in $[R(T_a) - R(t)]$ is $t_1$.) Thus the averaged value of the pulse current supplied to the thermomodule unit 2, and therefore the heat power to be supplied to the flow-cell 1 are also increased in proportion to Eq. (20). This increased supply of heat power corresponds to Eq. (8). Once the heat power is increased in proportion to Eq. (18), the flow-cell 1 is again starts to be heated up toward $T_a$, until the power supply and the heat dissipation again come to offset each other bringing the whole control system into the second equilibrium. In this second equilibrium, the temperature t of the flow-cell 1 remains at a temperature $t_2$, represented by relation $t_1 < t = t_2 < T_a$, and the sum given by Eq. (20) becomes equal to $V_{d1} + \alpha[R(Ta) - R(t_2)]$. According to FIG. 3, in this process toward the second equilibrium, point Q which has already reached point S in the first equilibrium starts to move therefrom toward point S', while point P which also has been at the point S once jumps up to point P' and then moves toward point S'. Both points P' and Q, of course, convege to point S' in the second equilibrium.

As is anticipated from the control process toward the second equilibrium, the control system according to the present invention stepwise adds supplementary control operations similar to the operation in the process toward the second equilibrium one by one each time an equilibrium state is established in the end of the preceding control process. Though, in principle, the addition of the supplementary control operations permanently continues making $\delta_n$ decrease infinitesimally, the system settles down in practice under the condition that $V_d(t)$ comes down to so small a value as to make the S/N ratio of the differential amplifier circuit 5 unity. Thus, the temperature t of the flow-cell 1 can be controlled to be substantially equal to the aiming temperature $T_a$. The time-process of increasing t toward $T_a$ is qualitatively illustrated by a curve shown in FIG. 4, in which three plateaus at $t_1$, $t_2$ and $t_3$ correspond to the points S, S' and S'' in FIG. 3 respectively. Each of these plateaus appears owing to the time needed for the microcomputer 7 to confirm the equilibrium states between the power supply and the heat dissipation in each step of the control.

The above description is for the case where $t < T_a$ was assumed in the beginning. In case $t > T_a$ is assumed in the beginning or in case t exceeds $T_a$ by any reason, for example, by reason of a sudden decrease of the environmental temperature $T_e$ during the process of increasing t toward $T_a$ or after the establishment of $t = T_a$, the difference signal $V_d(t)$ outputted from the amplifier 5 has its polarity inverted making the current to the thermomodule unit 2 flow in the inverse direction to absorb heat from the flow-cell 1. Thus the whole control system proceeds in the inverse direction so as to decrease the temperature t toward $T_a$.

Figure 5:
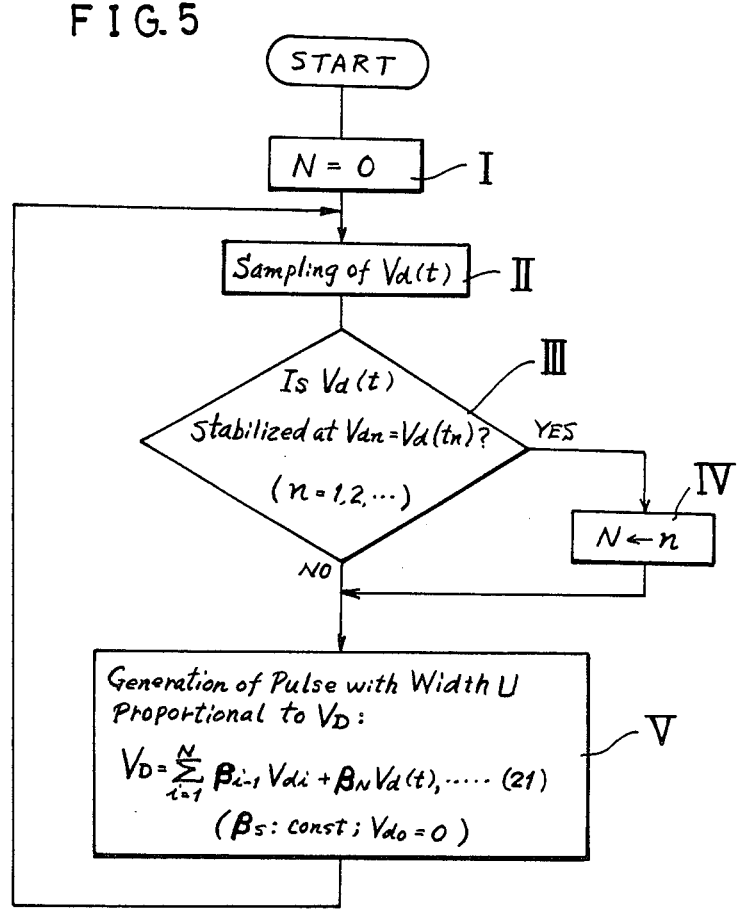
FIG. 5 is a flow-chart illustrating the performance of the embodiment.

The above described function of the embodiment can be summarized with a flow-chart shown in FIG. 5. In the flow-chart, N=0 in step I means that, in the beginning, the RAM 7b (FIG. 1) stores no signals to be added to the difference signal $V_d(t)$ from the amplifier circuit 5 (FIG. 1). The difference signal $V_d(t)$ is sampled (by the A-D converter 6 (FIG. 1)) at step II, and then proceeds, if judged to be still time-varying at step III, directly to step V, where the width U of the thermomodule driving pulse current is determined in accordance with a voltage $V_D(t)$ given by Eq. (21). Such a process through steps II, III and V is repeated until $V_d(t)$ comes to be stabilized to a constant voltage $V_{dn} = V_d(t_n)$ appearing at the n-th equilibrium. If $V_d(t)$ is judged to remain at $V_{dn}$ at step III, N in Eq. (21) is replaced with n(= 1, 2, ...). With N replaced with n, the process through steps II, III and V is again repeated. Therefore, until the first equilibrium is established making $V_d(t)$ be kept at $V_{d1}$ for the first time, $V_D$ consists only of a term $\beta_0 V_d(t)$ (corresponding to Eq. (3)) because N=0 in the beginning ($V_{do}$ appearing in Eq. (21) for all the values of N is defined to be zero). Thereafter, each time $V_d(t)$ is stabilized, $V_D$ is changed to $\beta_0 V_{d1} \beta_1 V_d(t)$ (corresponding to Eqs. (8) and (20)), $\beta_0 V_{d1} + \beta_1 V_{d2} + \beta_2 V_d(t), \ldots$ and so forth.

Although the present invention has been described with a heater controller exemplified as an embodiment, this improved system of proportional control is a fundamental invention, as is understood from claim 1 claimed in the following. Therefore, the present invention has an exceedingly wide and numerous applications such as a speed controller for a vehicle, a rotation controller, a level controller for a liquid stored in a bath with a drainage, and so forth.

We claim:

1. A proportional controlling system which controls a physical quantity of an objective by making a manipulating quantity operate on said objective and which has a first means for detecting said physical quantity, a second means for outputting a difference signal reflecting the difference between said physical quantity and a predetermined reference value, and a third means capable of generating said manipulating quantity in proportion to said difference signal, said proportional controlling system comprising:

an equilibrium-state detecting means for detecting that said physical quantity has been stabilized at a constant value;

a memory for memorizing said constant value;

an adding means for adding said constant value to said difference signal outputted from said second means; and a manipulating quantity changing means for making said third means generate a new manipulating quantity in accordance with the output from said adding means, thereby manipulating said objective in porportion to the sum of said constant value and said difference signal, once said physical quantity is stabilized at said constant value.

2. A proportional controlling system defined in claim 1, wherein said proportional controlling system is constituted in the form of a temperature controller in which said physical quantity is temperature, and said manipulating quantity is thermal energy, and wherein the functions of said equilibrium-state detecting means, said memory, said adding means and said manipulating quantity changing means are computerized.

* * * * *